(12) United States Patent
Smoke et al.

(10) Patent No.: US 10,900,378 B2
(45) Date of Patent: Jan. 26, 2021

(54) TURBINE TIP SHROUD ASSEMBLY WITH PLURAL SHROUD SEGMENTS HAVING INTERNAL COOLING PASSAGES

(71) Applicant: HONEYWELL INTERNATIONAL INC., Morris Plains, NJ (US)

(72) Inventors: Jason Smoke, Phoenix, AZ (US); Kent L. Kime, Phoenix, AZ (US); Blake Petersen, Scottsdale, AZ (US); Luke Zurmehly, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 213 days.

(21) Appl. No.: 15/899,780

(22) Filed: Feb. 20, 2018

(65) Prior Publication Data

US 2018/0363499 A1 Dec. 20, 2018

Related U.S. Application Data

(60) Provisional application No. 62/521,000, filed on Jun. 16, 2017.

(51) Int. Cl.
*F01D 25/12* (2006.01)
*F01D 9/04* (2006.01)
*F01D 11/08* (2006.01)
*F01D 5/22* (2006.01)
*F01D 11/24* (2006.01)
*F01D 25/24* (2006.01)

(52) U.S. Cl.
CPC ............. *F01D 25/12* (2013.01); *F01D 5/225* (2013.01); *F01D 9/04* (2013.01); *F01D 11/08* (2013.01); *F01D 11/24* (2013.01); *F01D 25/246* (2013.01); *F05D 2240/11* (2013.01); *F05D 2240/56* (2013.01); *F05D 2260/201* (2013.01)

(58) Field of Classification Search
None
See application file for complete search history.

(56) References Cited

U.S. PATENT DOCUMENTS

| | | | |
|---|---|---|---|
| 3,141,651 A * | 7/1964 | Moyer | F01D 25/26 415/136 |
| 3,963,368 A | 6/1976 | Emmerson | |
| 4,013,376 A | 3/1977 | Bisson et al. | |
| 4,157,232 A | 6/1979 | Bobo et al. | |
| 4,303,371 A | 12/1981 | Eckert | |
| 4,526,226 A | 7/1985 | Hsia et al. | |

(Continued)

FOREIGN PATENT DOCUMENTS

| | | |
|---|---|---|
| EP | 0516322 A1 | 12/1992 |
| EP | 1176285 A2 | 1/2002 |

(Continued)

OTHER PUBLICATIONS

Extended EP Search Report for Application No. 18166426.9 dated Oct. 12, 2018.

(Continued)

*Primary Examiner* — Michael Lebentritt
(74) *Attorney, Agent, or Firm* — Lorenz & Kopf, LLP

(57) ABSTRACT

A shroud assembly for a gas turbine engine includes a shroud support and a plurality of shroud segments that are attached to the shroud support. The shroud segment includes an internal cooling passage.

11 Claims, 13 Drawing Sheets

(56) References Cited

U.S. PATENT DOCUMENTS

| | | | |
|---|---|---|---|
| 4,573,866 A | 3/1986 | Sandy, Jr. et al. | |
| 5,088,888 A | 2/1992 | Bobo | |
| 5,165,847 A | 11/1992 | Proctor et al. | |
| 5,167,485 A | 12/1992 | Starkweather | |
| 5,205,115 A * | 4/1993 | Plemmons | F01D 11/24 60/806 |
| 5,649,806 A | 7/1997 | Scricca et al. | |
| 5,988,975 A | 11/1999 | Pizzi | |
| 5,993,150 A | 11/1999 | Liotta et al. | |
| 5,997,245 A | 12/1999 | Tomita et al. | |
| 6,089,822 A | 7/2000 | Fukuno | |
| 6,116,852 A * | 9/2000 | Pierre | F01D 11/24 415/115 |
| 6,139,257 A | 10/2000 | Proctor et al. | |
| 6,227,800 B1 | 5/2001 | Spring et al. | |
| 6,254,333 B1 | 7/2001 | Merry | |
| 6,254,345 B1 | 7/2001 | Harris et al. | |
| 6,331,217 B1 * | 12/2001 | Burke | F01D 5/184 148/522 |
| 6,340,285 B1 | 1/2002 | Gonyou et al. | |
| 6,354,795 B1 * | 3/2002 | White | F01D 11/24 415/116 |
| 6,666,645 B1 | 12/2003 | Arilla et al. | |
| 6,779,597 B2 | 8/2004 | DeMarche et al. | |
| 6,817,189 B2 | 11/2004 | Boeck | |
| 6,942,445 B2 | 9/2005 | Morris et al. | |
| 6,997,673 B2 | 2/2006 | Morris et al. | |
| 7,063,503 B2 | 6/2006 | Meisels | |
| 7,147,431 B2 | 12/2006 | Maguire et al. | |
| 7,147,432 B2 | 12/2006 | Lowe et al. | |
| 7,306,424 B2 | 12/2007 | Romanov et al. | |
| 7,604,453 B2 | 10/2009 | Lee et al. | |
| 7,665,962 B1 | 2/2010 | Liang | |
| 7,722,315 B2 | 5/2010 | Lee et al. | |
| 8,118,548 B2 | 2/2012 | Nigmatulin et al. | |
| 8,240,980 B1 | 8/2012 | Liang | |
| 8,313,301 B2 | 11/2012 | Hudson | |
| 8,353,663 B2 | 1/2013 | Arzel et al. | |
| 8,439,629 B2 | 5/2013 | Pietraszkiewicz et al. | |
| 8,814,507 B1 * | 8/2014 | Campbell | F01D 5/08 415/173.1 |
| 8,826,668 B2 | 9/2014 | Lee et al. | |
| 9,028,744 B2 | 5/2015 | Durocher et al. | |
| 9,500,095 B2 | 11/2016 | Pietrobon et al. | |
| 9,611,754 B2 | 4/2017 | Taylor | |
| 9,657,642 B2 | 5/2017 | Kanjiyani et al. | |
| 9,677,412 B2 | 6/2017 | Jones et al. | |
| 9,689,273 B2 | 6/2017 | Jones et al. | |
| 9,689,276 B2 * | 6/2017 | Lefebvre | F01D 25/12 |
| 10,502,093 B2 * | 12/2019 | Synnott | F01D 25/12 |
| 10,533,454 B2 * | 1/2020 | Synnott | F01D 5/081 |
| 2002/0154992 A1 | 10/2002 | Tiemann | |
| 2007/0025837 A1 | 2/2007 | Pezzetti, Jr. et al. | |
| 2008/0131264 A1 * | 6/2008 | Lee | F01D 11/24 415/116 |
| 2010/0074745 A1 * | 3/2010 | Jones | F01D 25/246 415/209.3 |
| 2010/0170264 A1 * | 7/2010 | Shi | F01D 25/14 60/782 |
| 2015/0013345 A1 | 1/2015 | Porter et al. | |
| 2016/0040553 A1 | 2/2016 | Headland | |
| 2016/0097303 A1 * | 4/2016 | Baldiga | F01D 25/246 416/182 |
| 2016/0169037 A1 | 6/2016 | Lefebvre et al. | |
| 2016/0215641 A1 | 7/2016 | Farah et al. | |
| 2016/0348526 A1 | 12/2016 | Vetters et al. | |
| 2017/0183978 A1 * | 6/2017 | Eng | F01D 11/08 |
| 2018/0258790 A1 * | 9/2018 | Jain | F01D 25/14 |
| 2018/0363486 A1 * | 12/2018 | Smoke | F01D 25/246 |

FOREIGN PATENT DOCUMENTS

| | | |
|---|---|---|
| EP | 1930549 A2 | 6/2008 |
| EP | 2492454 A2 | 8/2012 |
| EP | 2957728 A1 | 6/2014 |
| EP | 3190265 A1 | 7/2017 |
| WO | 2004057159 A1 | 7/2004 |
| WO | 2013162928 A1 | 10/2013 |
| WO | 2016028310 A1 | 2/2016 |

OTHER PUBLICATIONS

Stepka, Francis S. and Lawrence P. Ludwig, "Composite Wall Concept for High Temperature Turbine Shrouds—Heat Transfer Analysis," NASA Technical Memorandum 81539, Oct. 13-16, 1980.

Tamunobere, Onieluan, "Heat Transfer and Film Cooling on a Gas Turbine Blade and Shroud," LSU Doctoral Disertations, LSU Digital Commons, May 2015.

Kanjirakkad, Vasundevan, et al., "Passive Shroud Cooling Concepts for HP Turbines: Experimental Investigations," Journal of Turbomachinery, Jan. 28, 2008.

Passive Shroud Cooling in High Pressure Turbines, Whittle Laboratory, Mar. 2000.

Youlong, Fang, et al., The Radial Displacement of the HPT Blade Under the Effects of the Temperature Field and the Centrifugal, Science Direct, Jan. 2012.

* cited by examiner

TURBINE TIP SHROUD ASSEMBLY WITH PLURAL SHROUD SEGMENTS HAVING INTERNAL COOLING PASSAGES

CROSS-REFERENCE TO RELATED APPLICATIONS

This application claims priority to U.S. Provisional Patent Application Ser. No. 62/521,000, filed Jun. 16, 2017, the entire disclosure of which is incorporated by reference herein.

STATEMENT REGARDING FEDERALLY SPONSORED RESEARCH OR DEVELOPMENT

This invention was made with Government support under W58RGZ-16-C-0046 awarded by the U.S. Army. The Government has certain rights in the invention.

TECHNICAL FIELD

The present disclosure generally relates to a turbine tip shroud assembly and, more particularly, to a turbine tip shroud assembly with plural shroud segments having internal cooling passages.

BACKGROUND

Gas turbine engines are generally used in a wide range of applications, such as aircraft engines and auxiliary power units. In a gas turbine engine, air is compressed in a compressor, mixed with fuel, and ignited in a combustor to generate hot combustion gases, which flow downstream into a turbine section. In a typical configuration, the turbine section includes airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. For example, it is desirable to cool the shroud in the turbine section (i.e., the turbine shroud) to prevent or reduce oxidation, thermo-mechanical fatigue, and/or other adverse impacts. However, given the high temperature of engine operation, cooling remains a challenge.

Accordingly, it is desirable to provide gas turbine engines with improved turbine shroud cooling. Furthermore, other desirable features and characteristics of the present disclosure will become apparent from the subsequent detailed description and the appended claims, taken in conjunction with the accompanying drawings and this background discussion.

BRIEF SUMMARY

In one embodiment, a shroud assembly is disclosed for a gas turbine engine. The shroud assembly is configured to receive a cooling fluid flow. The shroud assembly includes a shroud support that extends arcuately about an axis. The shroud assembly also includes a plurality of shroud segments that are attached to the shroud support and that are arranged annularly about the axis at different circumferential positions with respect to the axis. At least one of the plurality of shroud segments includes an internal cooling passage that extends through the shroud segment. The shroud segment also includes at least one inlet for receiving and directing the cooling fluid flow into the internal cooling passage. Moreover, the shroud segment includes at least one outlet for outputting the cooling fluid flow from the internal cooling passage to a backflow cavity of the shroud assembly. The internal cooling passage is substantially hermetically sealed from the at least one inlet to the at least one outlet.

In another embodiment, a method of manufacturing a shroud assembly that is configured to receive a cooling fluid flow is disclosed. The method includes providing a shroud support that extends arcuately about an axis. The shroud support includes a shroud support inlet. The method also includes attaching a plurality of shroud segments to the shroud support at different circumferential positions about the axis to arrange the plurality of shroud segments annularly about the axis. At least one of the plurality of shroud segments includes an internal cooling passage that extends therethrough from an inlet to at least one outlet. Furthermore, the method includes fluidly connecting the inlet of the internal cooling passage to the shroud support inlet. The internal cooling passage is substantially hermetically sealed from the inlet to the at least one outlet. The at least one outlet is fluidly connected to a backflow cavity of the shroud assembly.

Furthermore, a gas turbine engine is disclosed that includes a rotor assembly of a turbine section. The rotor assembly includes a turbine blade. The gas turbine engine also includes a shroud assembly of the turbine section configured to receive a cooling fluid flow. The shroud assembly includes a shroud support that extends arcuately about an axis. The shroud assembly also includes a plurality of shroud segments that are attached to the shroud support and that are arranged annularly about the axis at different circumferential positions with respect to the axis. At least one of the plurality of shroud segments includes an inner diameter surface configured to oppose the turbine blade as the turbine blade rotates about the axis. The shroud segment also includes an internal cooling passage that extends through the at least one of the plurality of shroud segments. The shroud segment includes at least one inlet for receiving and directing the cooling fluid flow into the internal cooling passage. Furthermore, the shroud segment includes at least one outlet for outputting the cooling fluid flow from the internal cooling passage. The internal cooling passage is substantially hermetically sealed from the at least one inlet to the at least one outlet. The internal cooling passage includes a first chamber that is partly defined by a first backside surface, which faces opposite the inner diameter surface. The internal cooling passage includes a second chamber that is partly defined by a second backside surface, which faces opposite the inner diameter surface. The internal cooling passage includes a first impingement aperture directed into the first chamber generally toward the first backside surface. The internal cooling passage includes a second impingement aperture directed into the second chamber generally toward the second backside surface. The internal cooling passage is configured to direct the cooling fluid flow from the first impingement aperture into the first chamber and downstream into the second chamber via the second impingement aperture.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
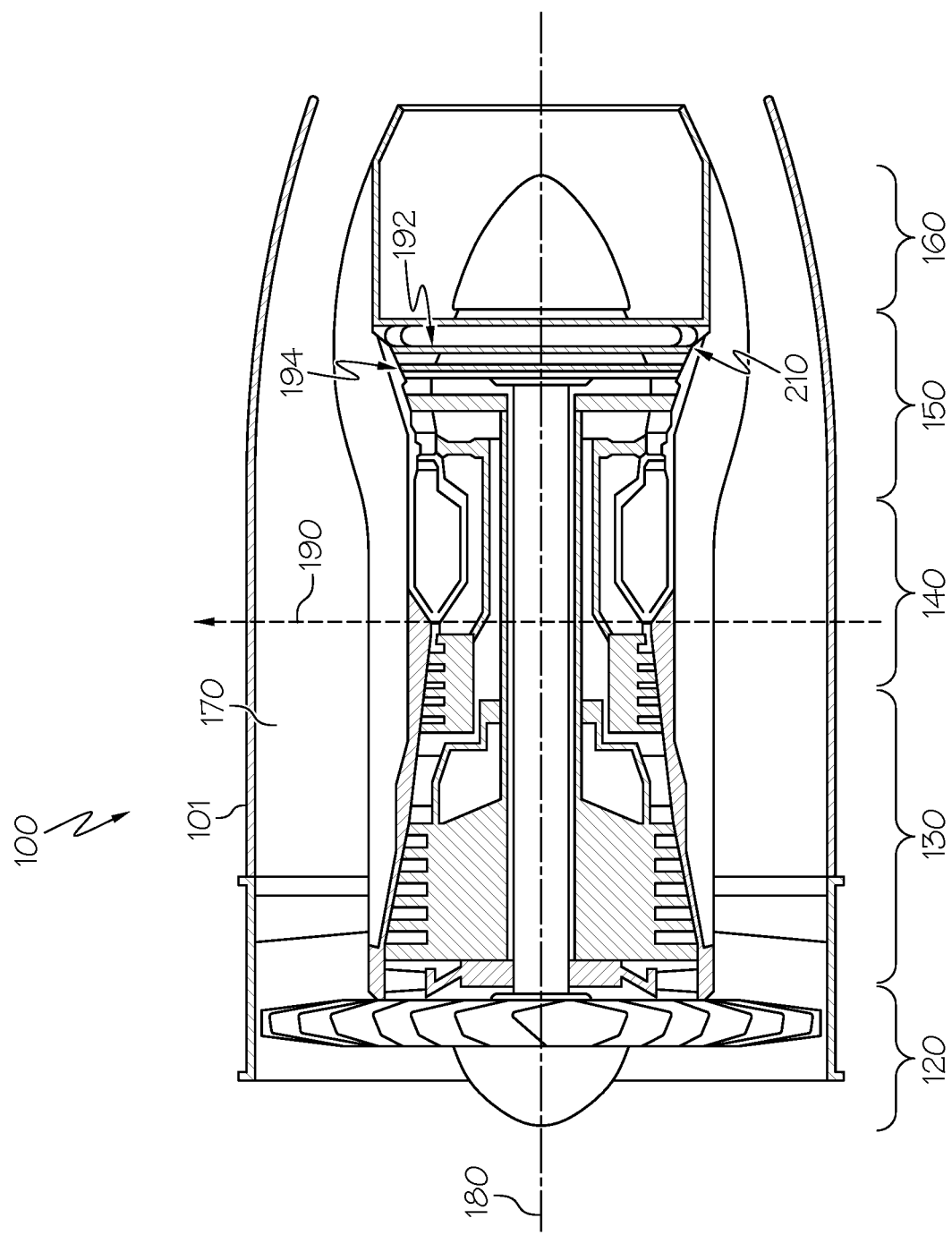
FIG. 1 is a schematic side view of a gas turbine engine according to exemplary embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, exemplary embodiments disclosed herein include gas turbine engines with one or more turbine shroud assemblies having improved cooling characteristics. Methods of manufacturing the turbine shroud assembly are also disclosed. In particular, exemplary embodiments include a turbine shroud assembly with internal impingement cooling passages configured for internally cooling components of the shroud assembly.

A shroud assembly is disclosed according to example embodiments, wherein the assembly includes a plurality of shroud segments that are independently attached and substantially sealed to a shroud support case. As such, the shroud segments and the shroud support case cooperate to define cooling flow passages for cooling the shroud segments and for directing the cooling fluid (e.g., air) to flow back into the core flow. The shroud segments may include internal cooling passages as well. The internal cooling passages may be airtight except for the one or more defined inlets and the one or more defined outlets of the shroud segment. In some embodiments, the internal cooling passages may impinge two or more times in succession. In other words, the shroud segment may include an internal cooling passage with at least two impingement apertures arranged in series with respect to the flow direction of the passage. Accordingly, the cooling effectiveness for a given amount of cooling flow is increased substantially.

Other details of the present disclosure will be discussed below with reference to the drawings. It will be appreciated that the embodiments of the present disclosure shown in the drawings are examples, and that the embodiments may vary from those shown without departing from the scope of the present disclosure.

FIG. 1 is a cross-sectional view of a gas turbine engine 100 according to an exemplary embodiment. Although FIG. 1 depicts a turbofan engine, in general, exemplary embodiments discussed herein may be applicable to another type of engine without departing from the scope of the present disclosure. The gas turbine engine 100 may form part of, for example, an auxiliary power unit for an aircraft or a propulsion system for an aircraft. However, the gas turbine engine 100 may be included on another vehicle without departing from the scope of the present disclosure. Instead of being included on a vehicle, the gas turbine engine 100 may also be supported by a stationary mount in some embodiments.

The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160, which are arranged sequentially along a longitudinal axis 180.

For reference purposes, the gas turbine engine 100 will be discussed with reference to a radial coordinate system. Accordingly, as used herein, the term "axial" refers to a direction along the longitudinal axis 180. A radial axis 190 is also included in FIG. 1 for reference purposes, and the term "radial" as used herein refers to a direction along the radial axis 190 or along another line extending radially with respect to the axis 180. Moreover, the term "circumferential" as used herein refers to a direction extending around or about the axis 180, at a particular radial distance from the axis 180.

The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140.

In the combustion section 140, the high pressure air is mixed with fuel, which is combusted. The post-combustion air is then directed into the turbine section 150.

The turbine section 150 may include a series of rotor assemblies 192 and stator assemblies 194, both of which are represented schematically in FIG. 1. The turbine section 150 may also include one or more shroud assemblies 210, which are also represented schematically. The shroud assembly 210 may generally encircle a respective rotor assembly 192. The shroud assembly 210 may encircle the tips of blades of the rotor assembly 192 and, thus, may be referred to as a turbine tip shroud assembly.

During operation, post-combustion air from the combustion section 140 may be directed by the stator assembly 194 toward blades included in the rotor assembly 192. The post-conduction air impinges upon the rotor blades, thereby driving and rotating the rotor assembly 192 relative to the turbine shroud assembly 210, causing the rotor assembly 192 to rotate a main engine shaft for energy extraction. The flow may be directed through a propulsion nozzle disposed in the exhaust section 160 to provide additional forward thrust.

To allow the turbine section 150 to operate at desirable elevated temperatures, certain components are cooled. For example, in some embodiments, the shroud assembly 210 may include one or more features of the present disclosure that promote cooling. Manufacturing techniques of the present disclosure are also discussed below for providing the shroud assembly 210 with the cooling features of the present disclosure.

Figure 2:
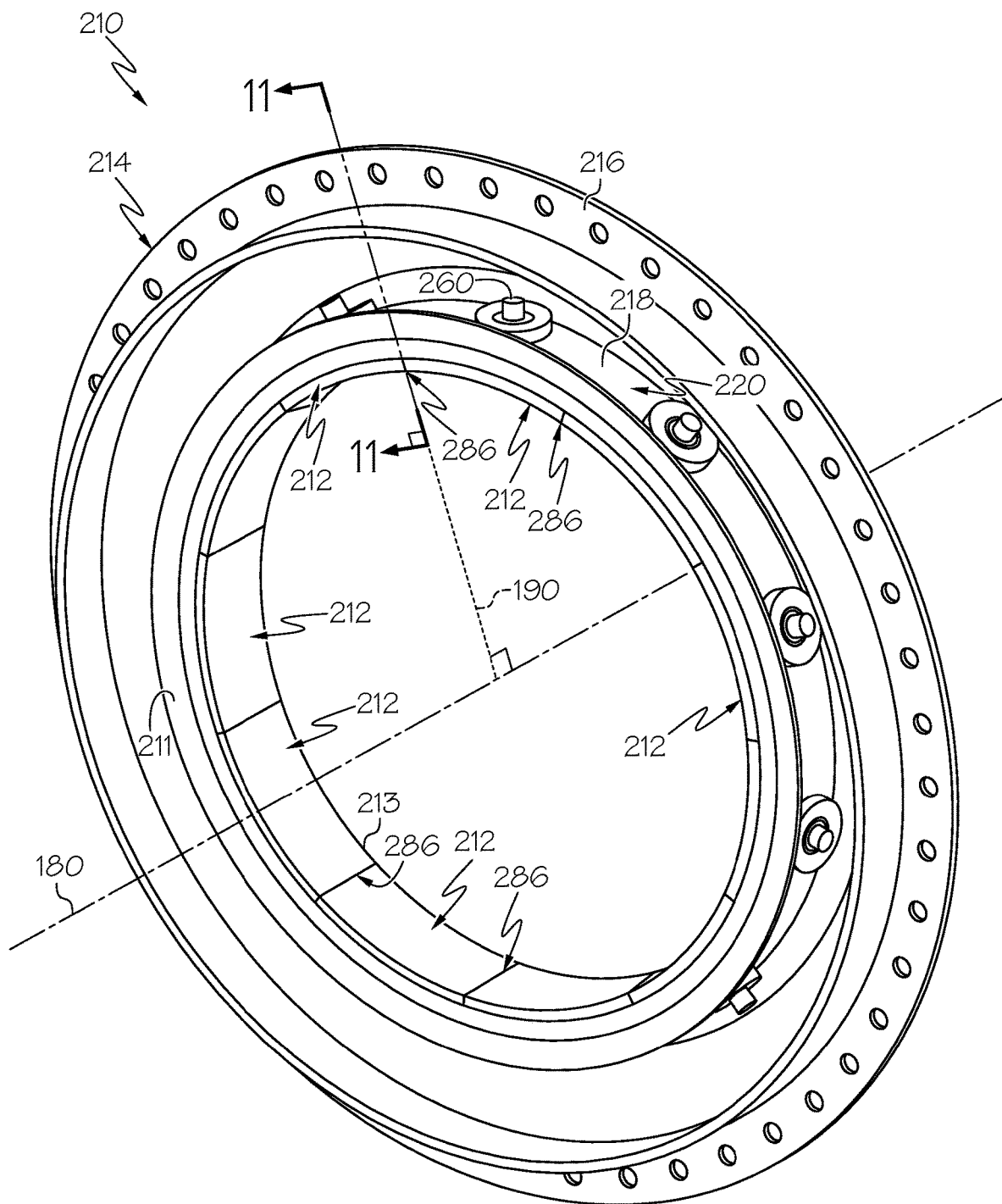
FIG. 2 is an isometric view of a turbine shroud assembly of the gas turbine engine of FIG. 1 according to example embodiments of the present disclosure.
Figure 3:
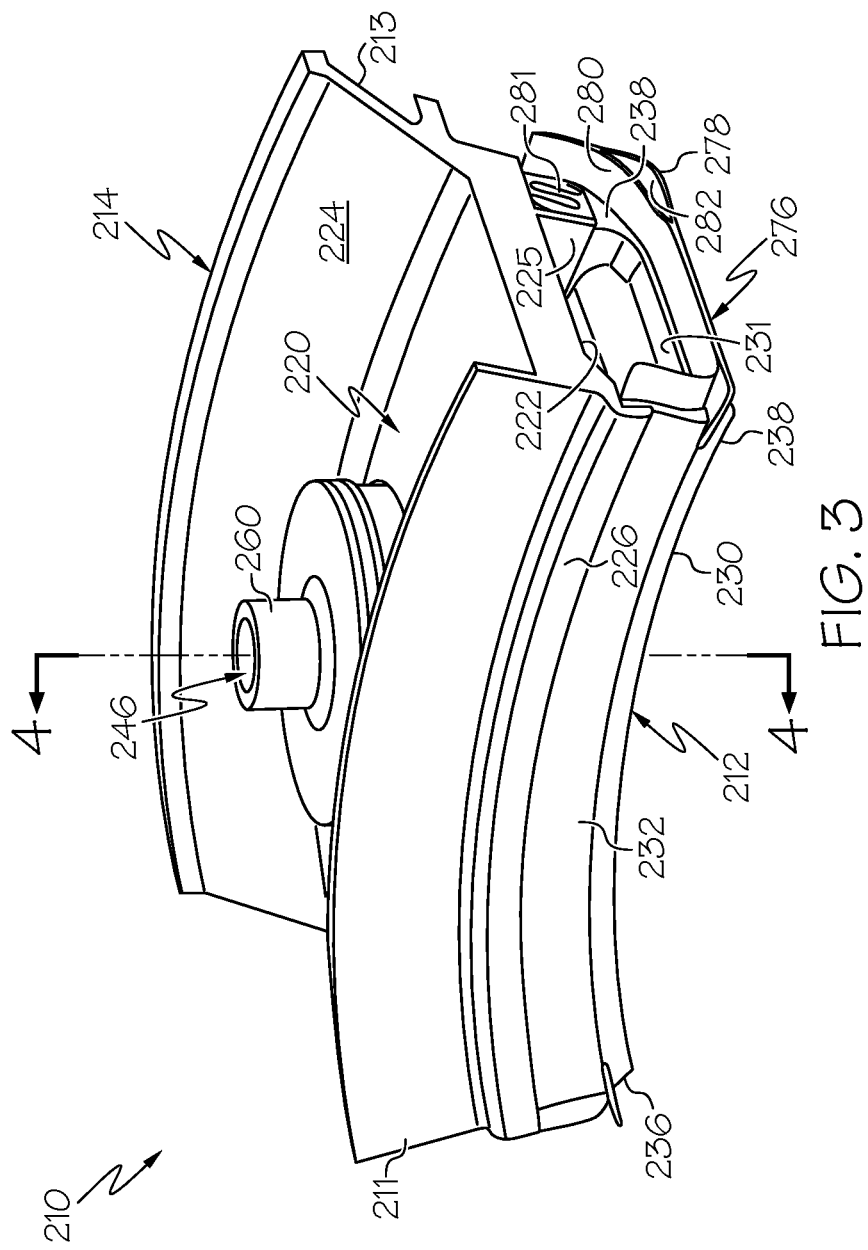
FIG. 3 is an isometric view of a portion of the turbine shroud assembly of FIG. 2, which includes a single shroud segment according to example embodiments of the present disclosure.
Figure 4:
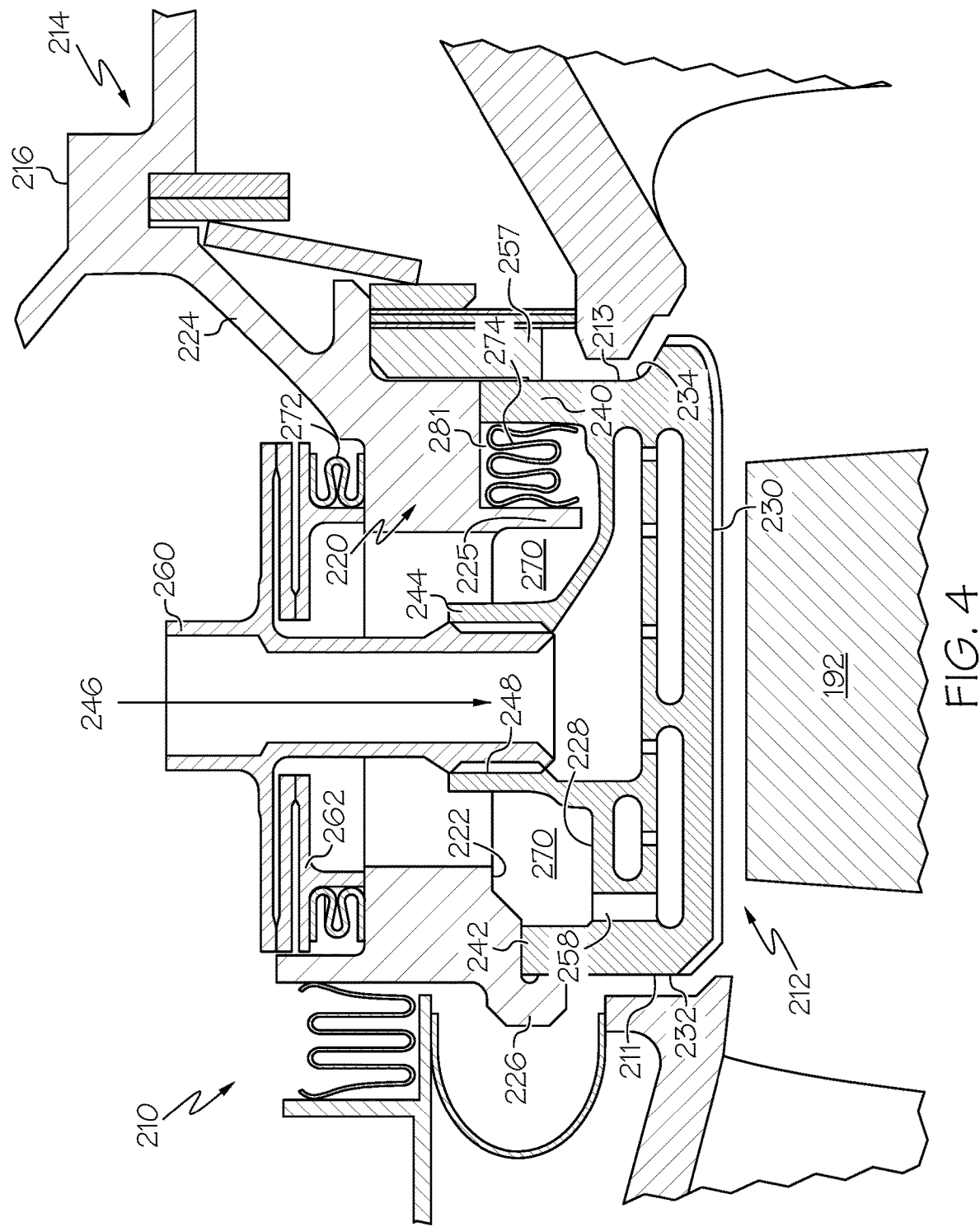
FIG. 4 is a section view of the turbine shroud assembly taken along the line 4-4 of FIG. 3.

Referring now to FIGS. 2, 3, and 4, the turbine shroud assembly 210 is shown in detail according to example embodiments. The turbine shroud assembly 210 may be substantially annular and may extend continuously in a circumferential direction about the longitudinal axis 180 (FIG. 2). The turbine shroud assembly 210 includes a leading edge 211 and a trailing edge 213, which are separated at a distance along the longitudinal axis 180. The leading edge 211 faces generally in a forward direction along the axis 180, and the trailing edge 213 faces generally in a rearward direction along the axis 180.

As shown in FIG. 2, the turbine shroud assembly 210 may include a shroud support 214. The shroud support 214 may be a substantially unitary, one-piece, annular component with at least a portion that extends continuously about the axis 180. The shroud support 214 may include an outer diameter portion 216 and an inner diameter portion 218. The outer diameter portion 216 may be fixedly attached to the engine case 101 (FIG. 1) or other surrounding support structure. The inner diameter portion 218 may include an inner ring 220. A circumferential segment of the inner ring 220 is shown in FIG. 3 and is shown in the section view of FIG. 4. As shown in FIGS. 3 and 4, the inner ring 220 may include an inner diameter surface 222. The inner ring 220 may also include a support arm 224, which attaches the inner ring 220 to the outer diameter portion 216. The shroud support 214 may further include a trailing edge member 225 and a leading edge member 226 (FIG. 3). As shown, the trailing edge member 225 and the leading edge member 226 may extend radially inward toward the longitudinal axis 180 from the inner ring 220. The trailing edge member 225 and the leading edge member 226 may be spaced apart along the axis 180.

Additionally, as shown in FIG. 2, the turbine shroud assembly 210 may include a plurality of shroud segments 212 that are arranged annularly about the axis 180. The shroud segments 212 may be spaced circumferentially about the inner diameter surface 222 of the inner ring 220. An individual shroud segment 212 from a particular circumferential position (with respect to the axis 180) is shown in FIGS. 3-6 in detail. The shroud segment 212 is attached to a portion of the inner ring 220 in FIGS. 3 and 4. The individual shroud segment 212 is shown in isolation in FIGS. 5 and 6.

In some embodiments, the shroud segment 212 may be a monolithic, unitary, one-piece member. In other embodiments, the shroud segment 212 may be constructed from multiple pieces that are attached. It will be appreciated that the shroud segment 212 of FIGS. 4-6 may be representative of other shroud segments at different circumferential positions on the shroud support 214.

Figure 5:
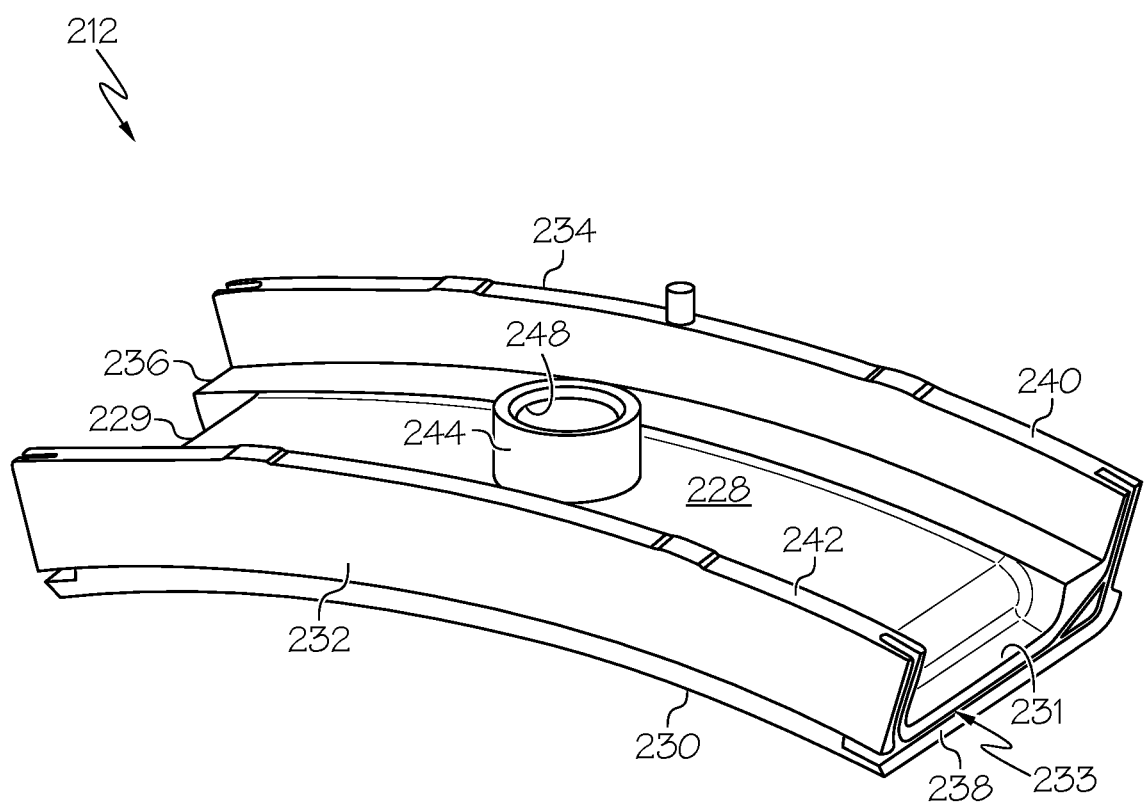
FIG. 5 is an isometric view of the shroud segment of FIG. 3.
Figure 6:
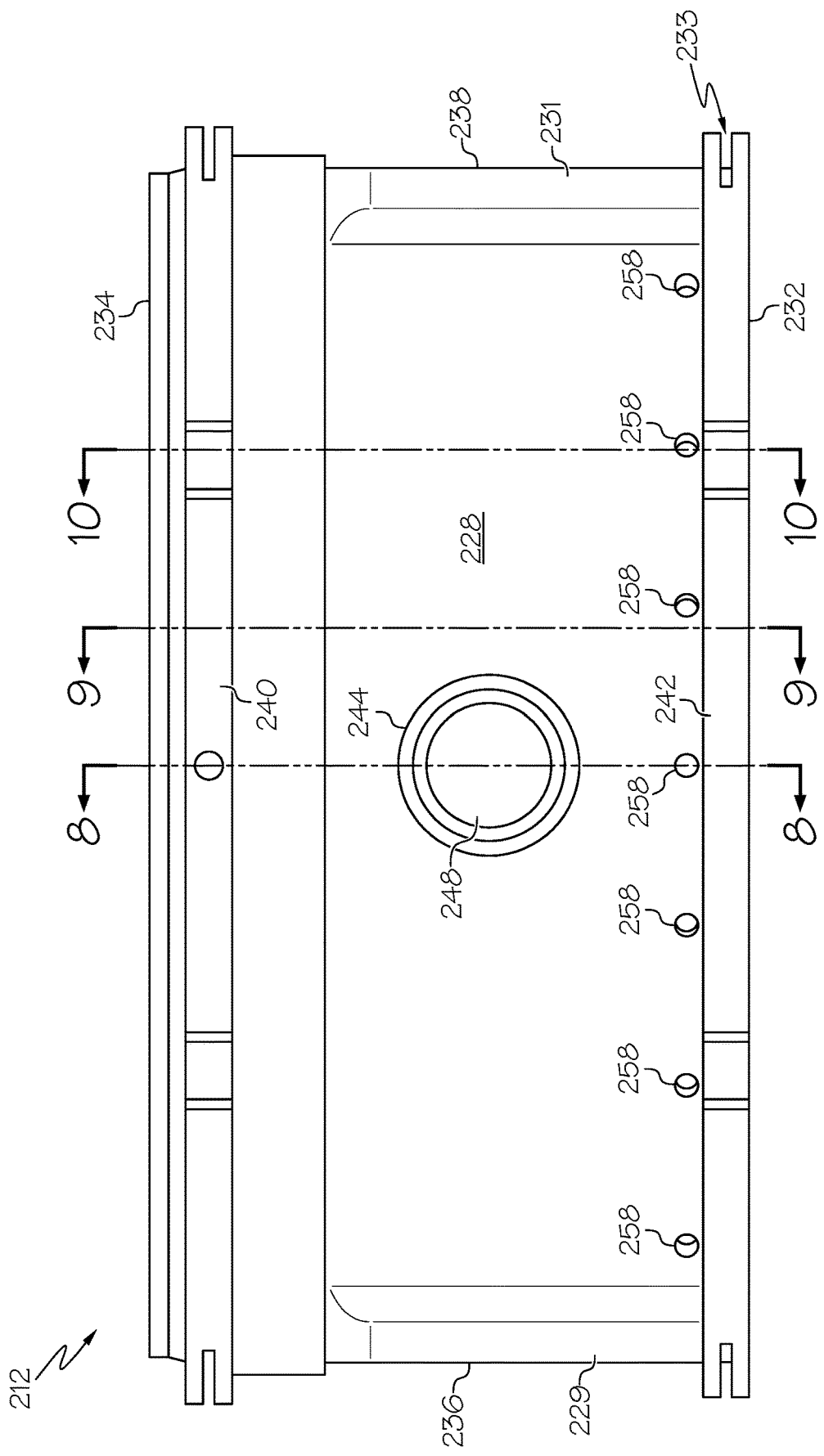
FIG. 6 is a top view of the shroud segment of FIG. 5.

As shown in FIGS. 4, 5 and 6, the shroud segment 212 may include an outer diameter surface 228 and an opposite inner diameter surface 230. The shroud segment 212 may further include an upstream face 232 and an opposite downstream face 234, which are spaced apart along the axis 180. The shroud segment 212 may also include a first end 236 and a second end 238. The shroud segment 212 may be elongate and slightly arcuate in the circumferential direction between the first end 236 and the second end 238. The shroud segment 212 may further include a trailing edge rail 240 and a leading edge rail 242. The trailing edge rail 240 and the leading edge rail 242 may project radially outward from the outer diameter surface 228 and away from the axis 180. The outer diameter surface 228 may also include a first end recess 229 proximate the first end 236 and a second end recess 231 proximate the second end 238.

Figure 7:
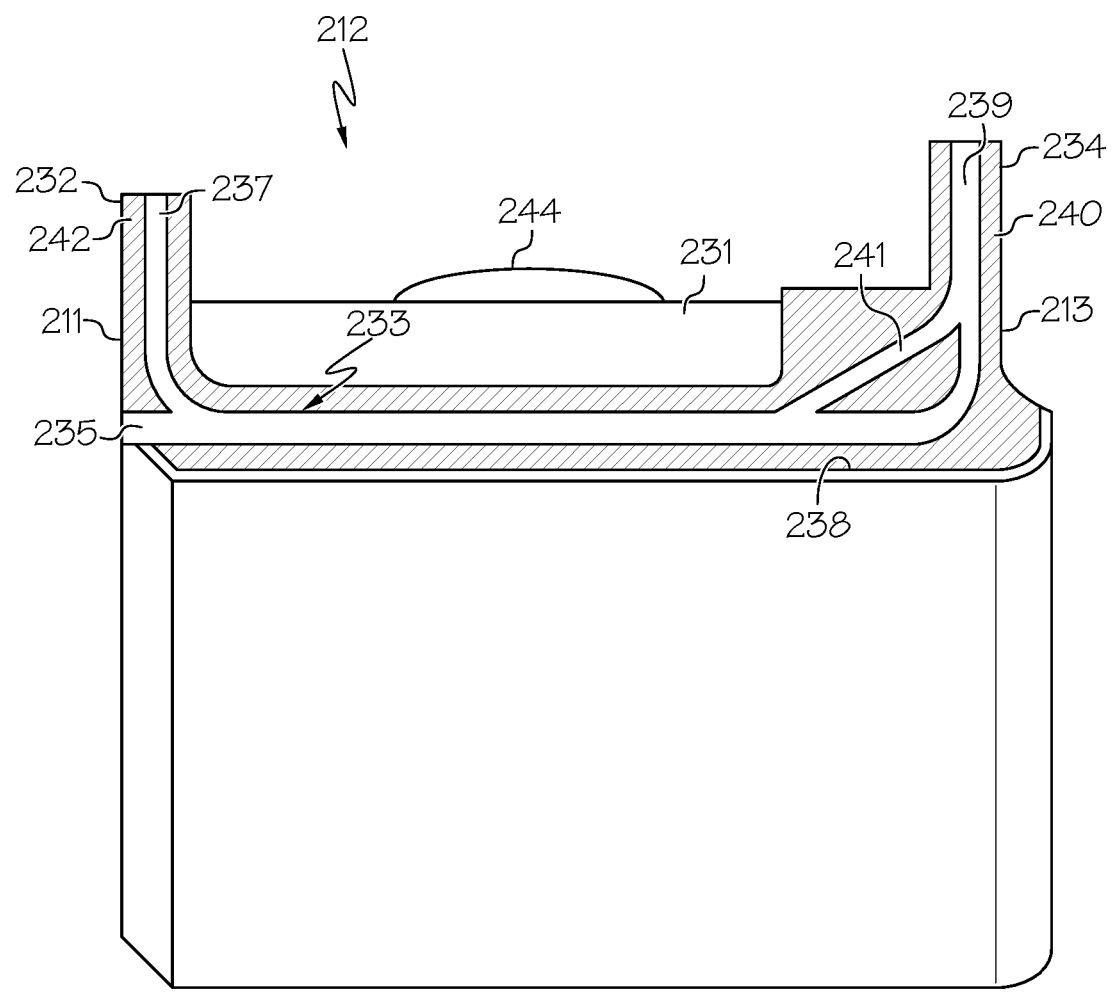
FIG. 7 is an end view of the shroud segment of FIG. 5.

The first end 236 and/or the second end 238 may include an arrangement of one or more grooves 233. As shown in FIG. 7, the grooves 233 may include a first groove 235 that extends axially along the shroud segment 212, continuously from the upstream face 232 to the downstream face 234. The grooves 233 may also include a second groove 237 that extends radially along the leading edge rail 242 and that curves to intersect the first groove 235. The grooves 233 may further include a third groove 239 that extends radially along the trailing edge rail 240 and that curves to intersect the first groove 235. Moreover, the grooves 233 may include a fourth groove 241 that extends diagonally between and that intersects both the first groove 235 and the third groove 239.

As shown in FIGS. 5 and 6, the shroud segment 212 may further include a projection 244. The projection 244 may be annular and may project radially away from the outer diameter surface 228. In some embodiments, the projection 244 may be disposed in a central region of the outer diameter surface 228, substantially centered axially between the upstream face 232 and the downstream face 234 and/or substantially centered circumferentially between the first end 236 and the second end 238. The projection 244 may be hollow, and the inner diameter of the projection 244 may be threaded in some embodiments.

Figure 8:
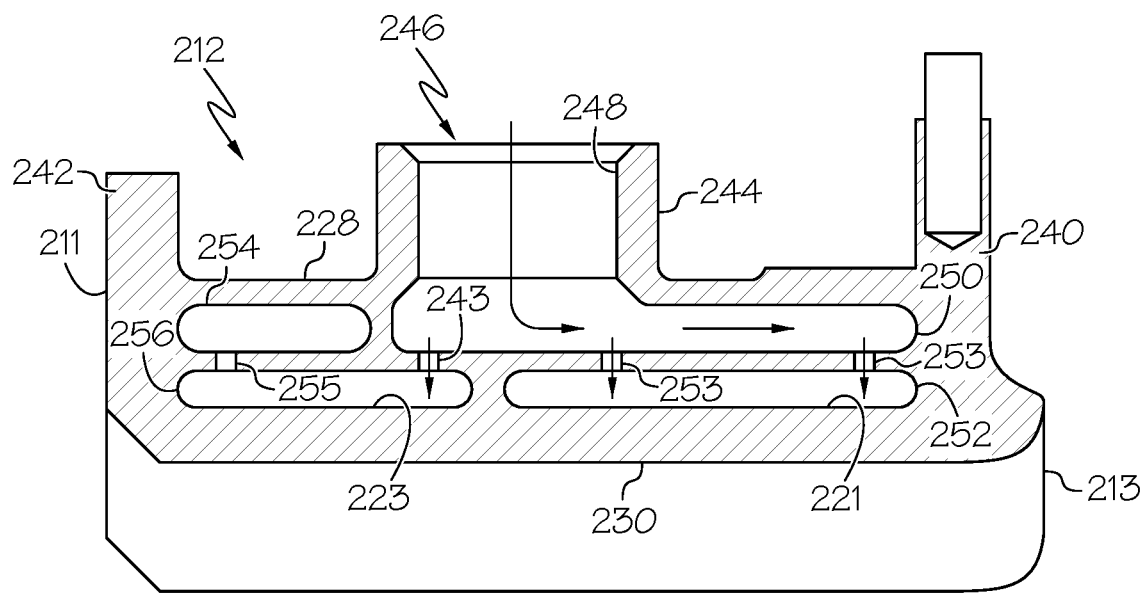
FIG. 8 is a section view of the shroud segment taken along the line 8-8 of FIG. 6.
Figure 9:
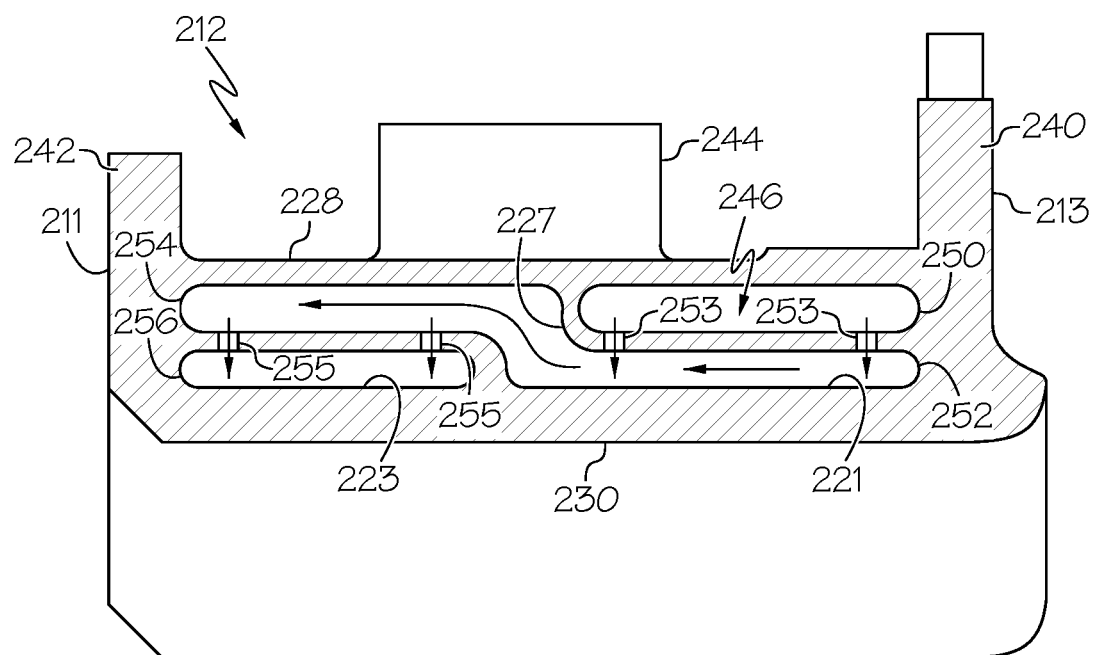
FIG. 9 is a section view of the shroud segment taken along the line 9-9 of FIG. 6.
Figure 10:
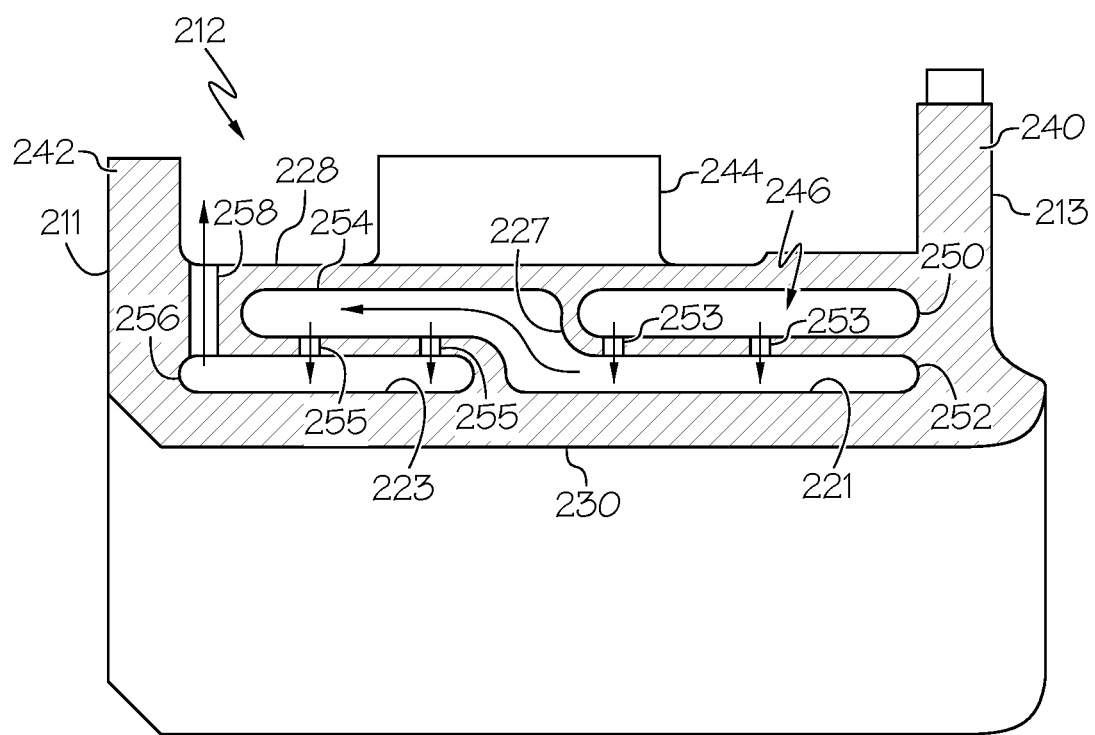
FIG. 10 is a section view of the shroud segment taken along the line 10-10 of FIG. 6.

The shroud segment 212 may include at least one internal cooling passage 246 as shown in FIGS. 8, 9, and 10. As shown in FIG. 8, the projection 244 may define an inlet 248 of the internal cooling passage 246.

The passage 246 of the shroud segment 212 may include a first chamber 250 and a second chamber 252. The first and second chambers 250, 252 may have a cross section that is elongated along the axis 180 and that extends substantially parallel to the axis 180. The first chamber 250 and the second chamber 252 may extend in the circumferential direction as well. The first and second chambers 250, 252 may be disposed proximate the trailing edge 213 and may be overlapped in the radial direction as shown. The first chamber 250 may be disposed outboard radially with respect to the second chamber 252 (i.e., the second chamber 252 may be disposed closer to the axis 180 in the radial direction as compared to the first chamber 250). The second chamber 252 may be partly defined by a trailing backside surface 221 of the shroud segment 212 (i.e., the surface opposite the inner diameter surface 230 proximate the trailing edge 213).

The first and second chambers 250, 252 may be fluidly connected by one or more first impingement apertures 253. The first impingement apertures 253 may extend radially through an internal wall separating the first and second chambers 250, 252.

The passage 246 of the shroud segment 212 may further include a third chamber 254 and a fourth chamber 256 as shown in FIGS. 9 and 10. The third and fourth chambers 254, 256 may have a cross section that is elongated along the axis 180 and that extends substantially parallel to the axis 180. The third chamber 254 and the fourth chamber 256 may extend in the circumferential direction as well. The third chamber 254 and the fourth chamber 256 may be disposed proximate the leading edge 211 and may be overlapped in the radial direction as shown. The third chamber 254 may be disposed outboard radially with respect to the fourth chamber 256. The fourth chamber 256 may be defined by a forward backside surface 223 of the shroud segment 212 (i.e., the surface opposite the inner diameter surface 230 proximate the leading edge 211).

The third chamber 254 may be fluidly connected to the second chamber 252 via an intermediate opening 227 as shown in FIGS. 9 and 10. The intermediate opening 227 may be relatively wide so as to facilitate fluid flow from the second chamber 252 to the third chamber 254.

Also, the third chamber 254 may be fluidly connected to the fourth chamber 256 by one or more second impingement apertures 255. The second impingement apertures may extend radially through an internal wall separating the third and fourth chambers 254, 256.

In some embodiments, there may be at least one third impingement aperture 243 (FIG. 8). The third impingement aperture 243 may fluidly connect the first chamber 250 and the fourth chamber 256.

Moreover, the shroud segment 212 may define one or more outlets 258 of the internal cooling passage 246 (FIGS. 6 and 10). In the illustrated embodiment, there are a plurality of outlets 258. As shown, the outlets 258 may be circular through-holes that extend radially from the fourth chamber 256 and through the outer diameter surface 228. In some embodiments, the outlets 258 may be disposed proximate the leading edge rail 242 (FIG. 10), and the outlets 258 may be spaced apart from each other in the circumferential direction (FIG. 6).

As shown in FIGS. 2, 3, and 4, the shroud segments 212 may be fixedly attached to the shroud support 214. The shroud segments 212 may be independently and individually attached to the shroud support 214. Also, the shroud segments 212 may be substantially sealed (e.g., substantially hermetically sealed) to the shroud support 214. As such, the shroud segment 212 and the shroud support 214 cooperate to define an airflow path, and the inlet 248 and the outlets 258 may define part of this airflow path as will be discussed in detail below.

In some embodiments, the shroud segment 212 may be fixed to the shroud support 214 via a fastener 260. In some embodiments, the fastener 260 may be the only fastener 260 used for the attachment of the shroud segment 212 and the shroud support 214. The fastener 260 may be hollow and tubular in some embodiments. Additionally, in some embodiments, the fastener 260 may extend radially through the shroud support 214 to be received within the projection 244. In some embodiments, the fastener 260 may threadably engage the inner diameter of the projection 244. Accordingly, the interior of the fastener 260 may be fluidly connected to the inlet 248 of the internal cooling passages 246. Also, the fastener 260 may include an enlarged head 262 that engages the outer diameter surface of the ring 220. The fastener 260 may also include one or more support structures that support the fastener 260, allow for thermal expansion, etc. Accordingly, the fastener 260 may press the outer diameter portions of the shroud segment 212 to the inner diameter surface 222 of the ring 220 and apply a force that is directed substantially in the radial direction.

When attached (FIG. 4), the leading edge rail 242 of the shroud segment 212 may be disposed proximate the leading edge member 226 of the shroud support 214. The upstream face 232 may be disposed adjacent the opposing surface of the leading edge member 226. Also, the trailing edge rail 240 of the shroud segment 212 may be disposed proximate the trailing edge member 225 of the shroud support 214. An axial retention member 257 may be included proximate the trailing edge rail 240. The axial retention member 257 may abut the trailing edge 240 and apply an axial load. Accordingly, the axial retention member 257 may substantially seal against the rail 240 due to the axial load. In some embodiments, the axial retention member 257 may include or comprise a so-called brush seal. A trailing edge space 281 may be defined between the axial retention member 257, the trailing edge member 225, the inner diameter surface 222 of the ring 220, and the outer diameter surface 228 of the shroud segment 212.

Moreover, the shroud segment 212 may cooperate with the shroud support 214 to define an outlet chamber 270. The outlet chamber 270 may be referred to as a "backflow cavity," which is disposed upstream from the core flow path. Specifically, in some embodiments, the outer diameter surface 228 and the leading edge rail 242 of the shroud segment 212 may cooperate with the inner diameter surface 222 and the trailing edge member 225 of the shroud support 214 to define the outlet chamber 270. The outlet chamber 270 may be generally arcuate in shape and may extend in the circumferential direction toward the first end 236 and the second end 238 of the shroud segment 212.

The shroud assembly 210 may further include one or more sealing members that seal gap(s) between plural components. In some embodiments, the sealing members may be arranged for directing flow in a predetermined manner.

For example, as shown in FIG. 4, the shroud assembly 210 may include a first sealing member 272 that is disposed between the head 262 of the fastener and the outer diameter surface of the ring 220 of the shroud support 214. The first sealing member 272 may be a flexible metal seal in some embodiments.

The shroud assembly 210 may further include a second sealing member 274. The second sealing member 274 may be disposed within the trailing edge space 281, between the trailing edge rail 240 of the shroud segment 212 and the trailing edge member 225 of the shroud support 214. In some embodiments, the second sealing member 274 may be a flexible metal seal. The second sealing member 274 may also partly define the outlet chamber 270 and may be configured as a fluid boundary proximate the trailing edge 213.

The shroud assembly 210 may also include other sealing members, such as a sealing compound that is included at the threaded attachment of the fastener 260 and the projection 244. Other sealing members may also be included in some embodiments. Accordingly, the shroud segment 212 may be substantially hermetically sealed to the shroud support 214.

Figure 11:
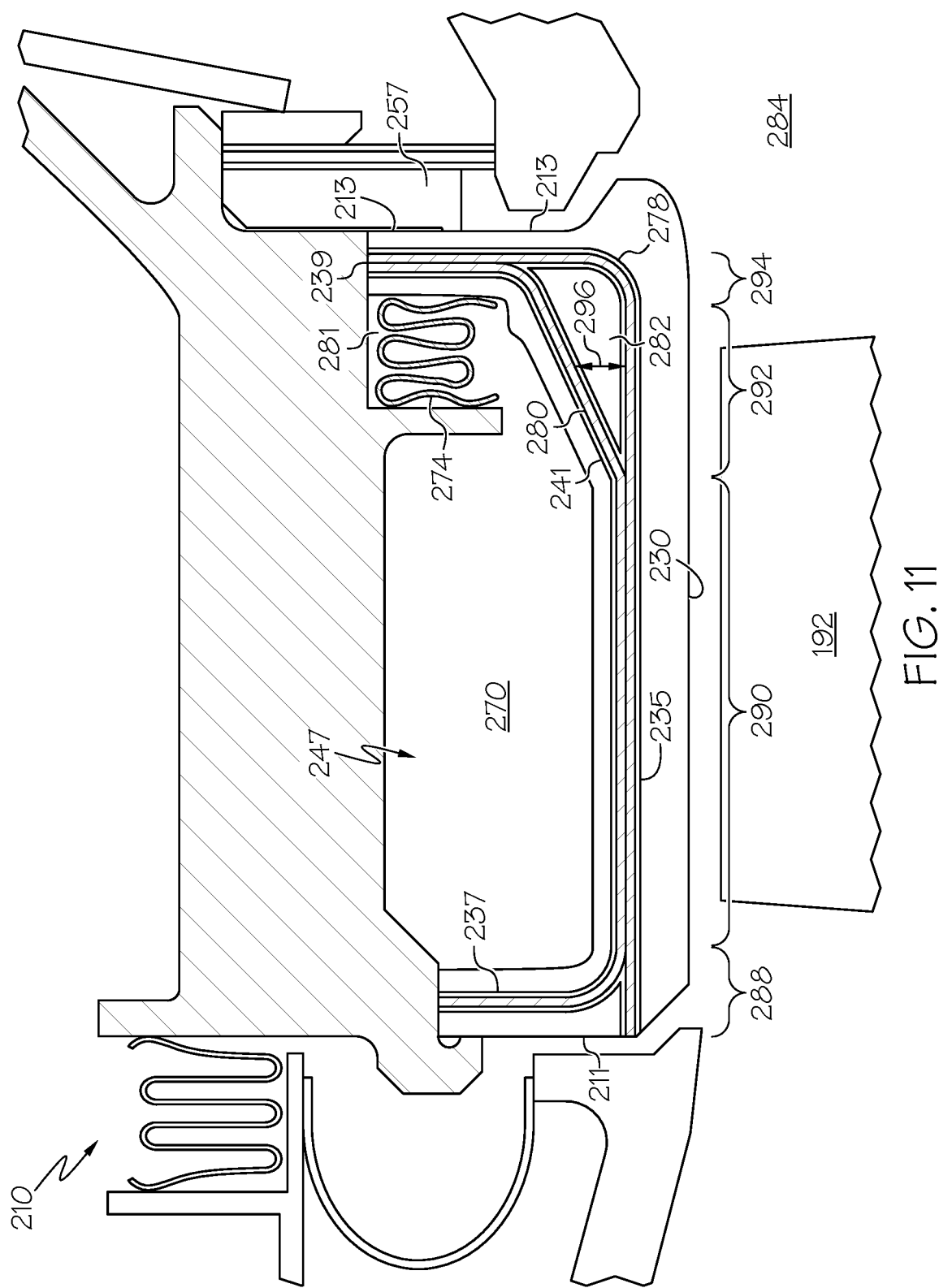
FIG. 11 is a section view of an inter-segment joint of the turbine shroud assembly taken along the line 11-11 of FIG. 2.

Furthermore, as shown in FIG. 3, the first end 236 and/or the second end 238 of the shroud segment 212 may include an inter-segment sealing member 276. The inter-segment sealing member 276 may include one or more so-called feather seals. The inter-segment sealing member 276 on the second end 238 is shown, and it will be appreciated that the first end 236 may include a similar sealing member. In some embodiments, the inter-segment sealing member 276 may include a third seal 278 and a fourth seal 280. The third seal 278 and the fourth seal 280 may be received in the grooves 233 (FIG. 7) of the second end 238 as shown in FIG. 3, and it will be appreciated that the third and fourth seals 278, 280 may also be received within grooves 233 of a neighboring (opposing) shroud segment 212 within the shroud assembly 210. As shown in FIG. 11, the third seal 278 may be received within the first groove 235 and the third groove 239. The fourth seal 280 may be received within the second groove 237, within portions of the first groove 235, within the fourth groove 241, and within portions of the third groove 239. Areas of the third seal 278 and the fourth seal 280 may overlap and may be layered in contact with each other. For example, as shown in FIG. 11, the third seal 278 and the fourth seal 280 may layer over each other within the first groove 235 and proximate the terminal end of the third groove 239. At other areas, the third and fourth seals 278, 280 may be spaced apart from each other. For example, the third seal 278 may be spaced from the fourth seal 280 to define an intermediate cavity 282 therebetween.

During operation of the gas turbine engine 100, tips of the blades on the rotor assembly 192 (FIGS. 1 and 11) rotate relative to the inner diameter surface 230 of the shroud segment 212. The shroud segments 212 may heat up to relatively high temperatures. To regulate the temperature of the shroud segments 212, a cooling gas flow (e.g., air diverted from the core flow of the engine 100 upstream of the combustion section 140) may be directed through the fastener 260, into the inlet 248 of the internal cooling passage 246. The flow may be directed into the first chamber 250, through the first impingement apertures 253, and into the second chamber 252. Flow from the first impingement apertures 253 may be directed toward the trailing backside surface 221 for cooling the shroud segment 212. Then, the flow may be directed forward (i.e., re-directed) along the axis 180 into the third chamber 254 (FIG. 9). The flow may be directed, through the second impingement apertures 255 from the third chamber 254 to the fourth chamber 256. Flow from the second impingement apertures 255 may be directed toward the forward backside surface 223 for further cooling of the shroud segment 212. The fluid flow may exit the shroud segment 212 via the outlets 258. Additionally, some of the cooling fluid may flow from the inlet 248, through the third impingement aperture 243 (FIG. 8), to the fourth chamber 256, and out the outlets 258.

The internal cooling passages 246 may be defined within the shroud segments 212 such that the mass flow at the inlet 248 is be substantially equal to the mass flow at the outlets 258. In other words, the internal cooling passage 246 may be sealed along its flow path (from the inlet 248 to the outlets 258), and there may be no leakage path for fluid in the cooling passages 246. The flow may then flow back into the core flow path of the engine 100 through one or more gaps. For example, the cooling gas may flow axially into the core flow and/or circumferentially into the inter-segment joints between neighboring pairs of the shroud segments 212. Ultimately, the cooling gas may flow radially inward to return to the core flow path.

This flow of air may provide a cooling effect to the shroud segment 212, thereby improving efficiency and effectiveness of the gas turbine engine 100. As discussed above, each shroud segment 212 may be constrained and sealed individually to the shroud support 214. Also, substantially all cooling flow impinges the backside of the shroud segment 212 multiple times (e.g., twice) in succession. As such, for a given amount of cooling mass flow, impingement is multiplied (e.g., by two). Thus, impingement velocities may be higher, and cooling effectiveness may be increased.

Additionally, as discussed above, the shroud assembly 210 at the inter-segment joints may improve flow characteristics. The arrangement of the third and fourth seals 278, 280 (FIG. 11) may define the intermediate cavity 282 proximate the trailing edge 213 and between the outlet chamber 270 and the core flow path 284. Also, the trailing edge space 281 may be disposed proximate the trailing edge 213. This may cause multiple (e.g., two) pressure drops along the axis 180 between the outlet chamber 270 and the core flow path 284. This dual-series pressure drop reduces inter-segmental leakage at the trailing edge 213, wherein the static pressure of the flow path is lowest.

The shroud segments 212 and other features of the shroud assembly 210 may be manufactured in a variety of ways without departing from the scope of the present disclosure. For example, the shroud segments 212 may be formed using multiple parts that are bonded together, that are inseparable, and/or that are integrally connected (e.g., via a brazing, laser welding, diffusion bonding, or other manufacturing process). In additional embodiments, the shroud segments 212 may be made from a single part produced, for example, by investment casting or additive manufacturing processes. In further embodiments, a casting core may be formed using an additive manufacturing technique, and then the casting core may be used to form features of the shroud segment 212 (e.g., ceramic stereo-lithography). Furthermore, in some embodiments, features of the segments 212 may be machined using turning, milling, grinding, electrical discharge machining (EDM), or other machining operations.

Figure 12:
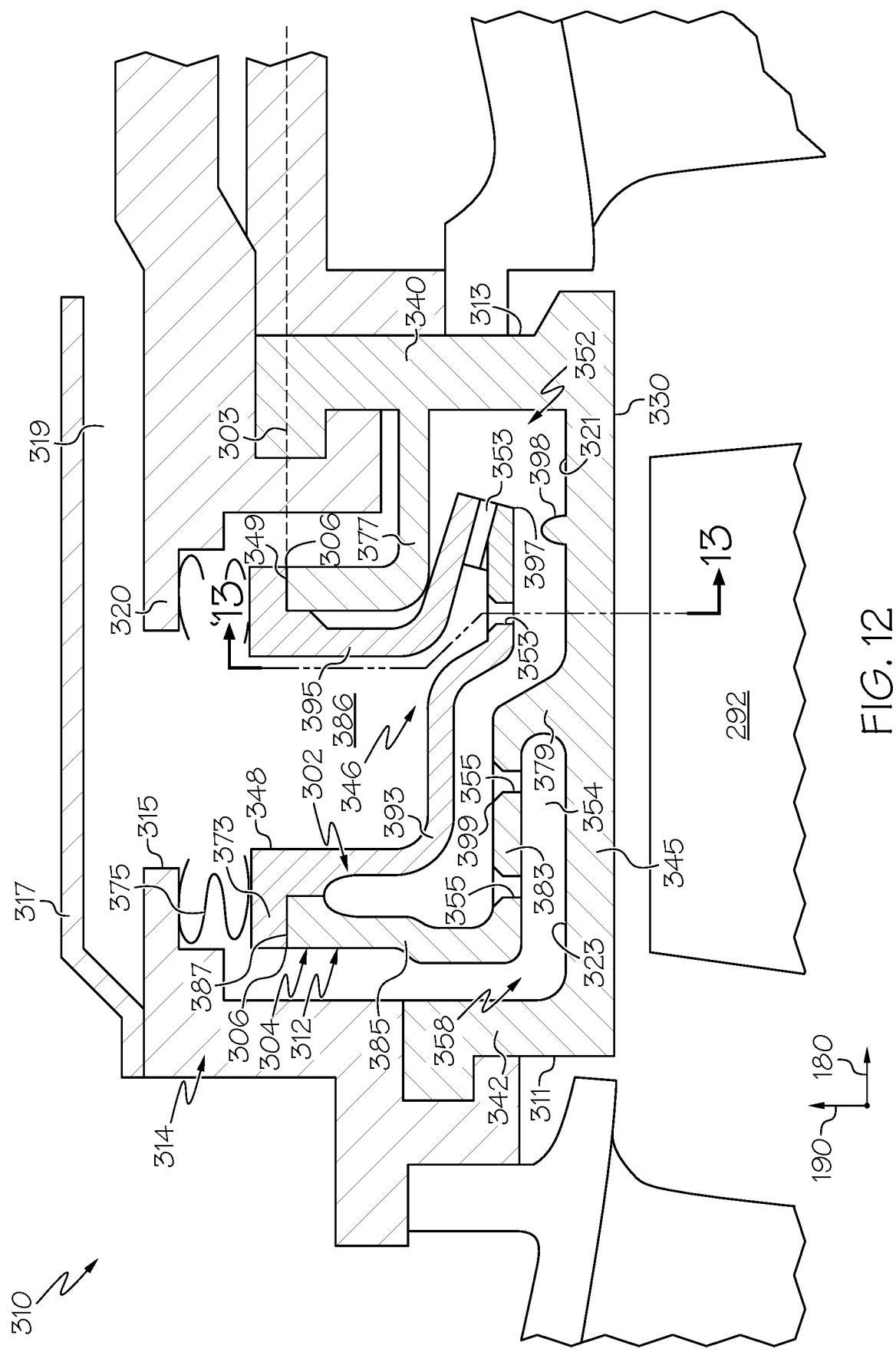
FIG. 12 is a section view of the turbine shroud assembly taken along the longitudinal axis according to additional embodiments of the present disclosure.
Figure 13:
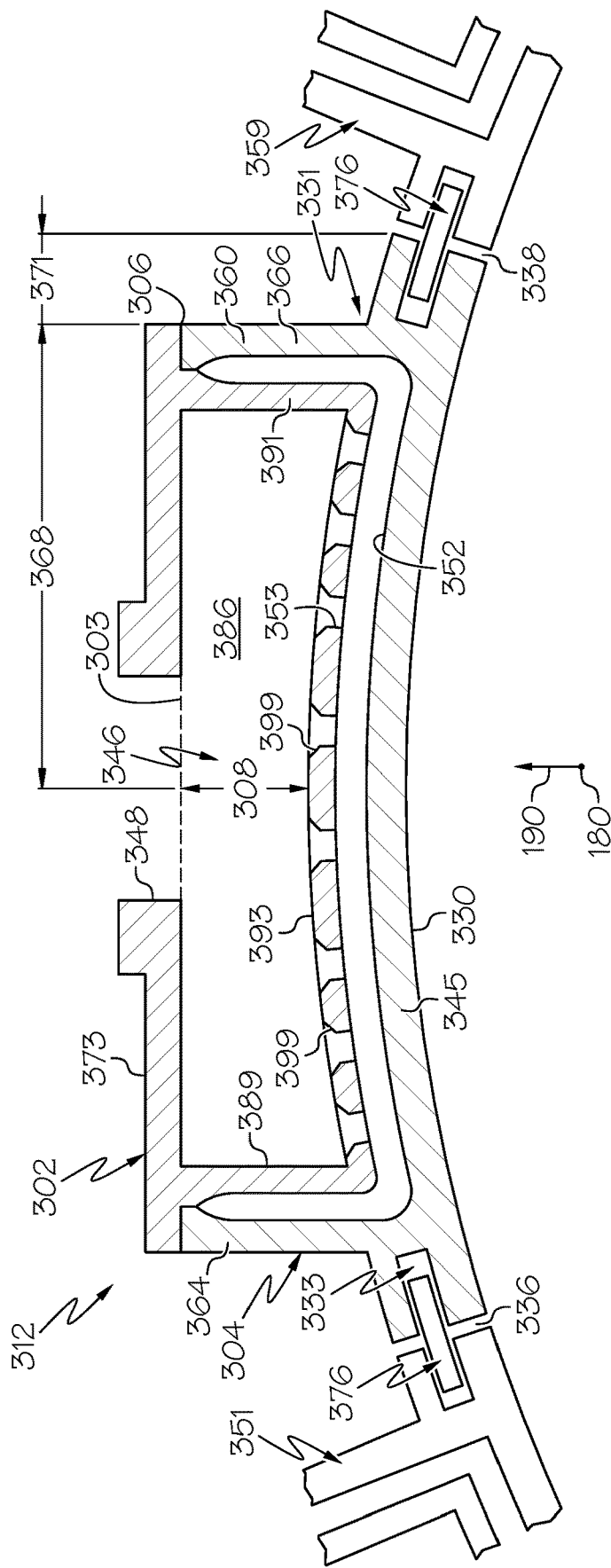
FIG. 13 is a section view of the shroud segment of the shroud assembly taken along the line 13-13 of FIG. 12.
Figure 14:
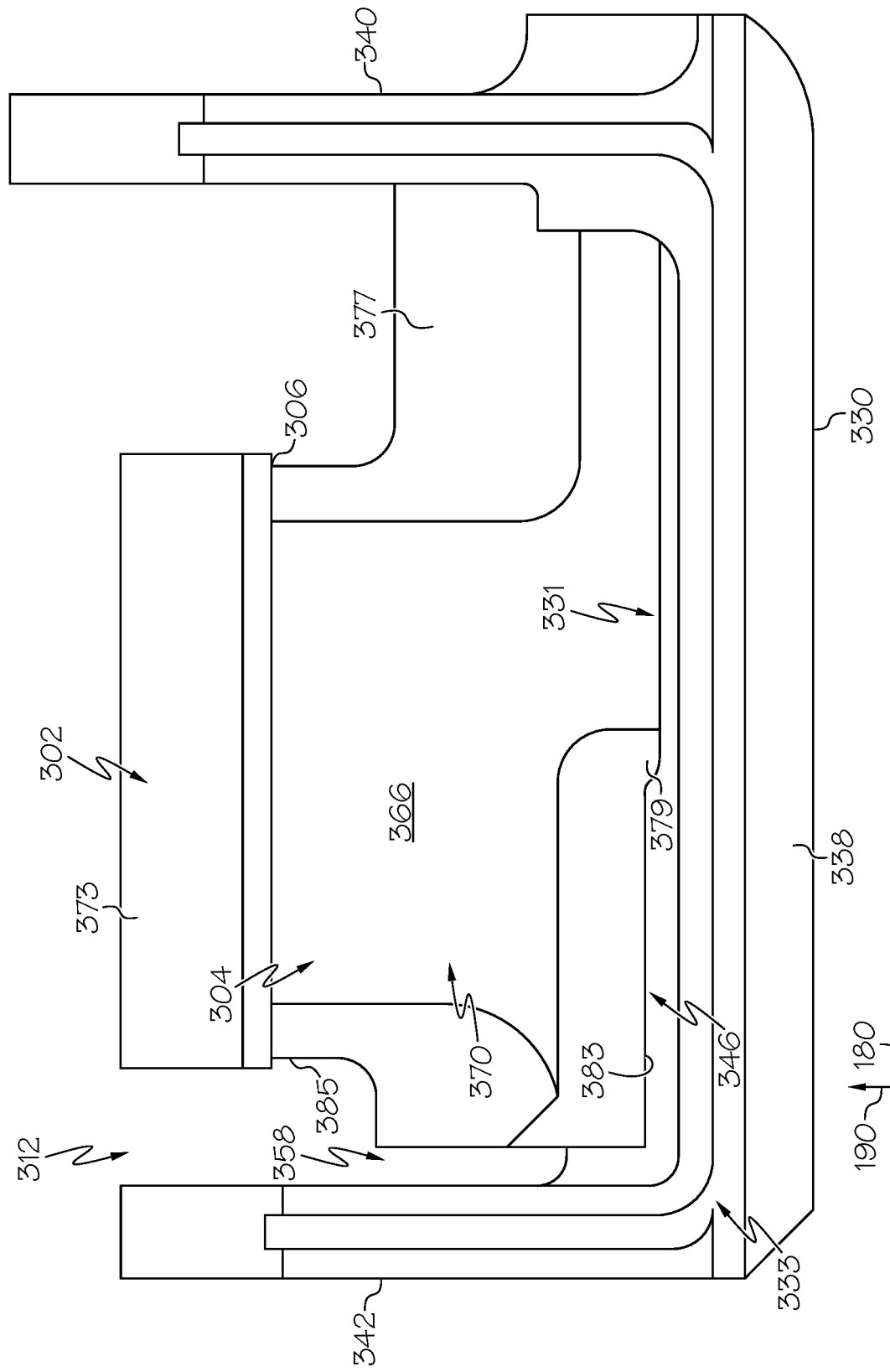
FIG. 14 is a circumferential end view of the shroud segment of FIG. 12.

Referring now to FIGS. 12-14, the shroud assembly 310 is represented according to additional embodiments of the present disclosure. The shroud assembly 310 may include features that are discussed above in relation to FIGS. 1-11. Components that correspond to those of FIGS. 1-11 are indicated with corresponding reference numbers increased by 100. Additional features are discussed below.

The shroud support 314 is shown in the section view of FIG. 12. As shown, the shroud support 314 may include a shroud support inlet 315. The shroud support inlet 315 may be a through-hole that extends radially through the inner ring 320 of the shroud support 314.

The shroud assembly 310 may further include a baffle wall 317. The baffle wall 317 may be a relatively thin-walled structure that is fixedly attached to the shroud support 314 proximate the leading edge 311 of the shroud assembly 310. The baffle wall 317 may be spaced outwardly radially from the inner ring 320 as shown in FIG. 12 and may extend over and at least partially cover over the shroud support inlet 315. Accordingly, in some embodiments, an upstream plenum 319 may be at least partly defined between the baffle wall 317 and the outer diameter surface of the inner ring 320 of the shroud support 314. Cooling air may be received within the plenum 319, and as will be discussed, the cooling air may flow downstream into the shroud support inlet 315 to provide a cooling effect.

Like the embodiment of FIG. 2, the shroud assembly 310 of FIGS. 12-14 may include the shroud segment 312. The shroud segment 312 may include the inner diameter surface 330, which opposes the tip of the blade of the rotor assembly 292. During operation, heat at the inner diameter surface 330 may transfer through the shroud segment 312 and other areas of the shroud assembly 310. However, the shroud segment 312 may include the internal cooling passage 346, which may be fluidly connected to the shroud support inlet 315 to receive a cooling fluid flow (airflow) for cooling the shroud segment 312.

Like the embodiments discussed above, the internal cooling passage 346 may include at least two impingement apertures that are arranged in series in a downstream direction. As such, cooling air passing through one impingement aperture cools an inner surface of the passage 346, then flows downstream through the passage 346 through another impingement aperture for further cooling of another inner surface of the passage 346. Air within the internal cooling passage 346 then exits the shroud segment 312 and may flow to the core flow. These configurations provide the shroud assembly 310 with efficient and effective cooling for improved operation of the gas turbine engine.

Moreover, the shroud segment 312 may be strong, resilient, and robust due to a number of features that will be discussed. These features allow the shroud segment 312 to withstand thermally-driven mechanical effects (e.g., thermal expansion and resulting stresses, etc.) on the shroud segment 312 and/or other parts of the assembly 310. In addition, the shroud segment 312 may include one or more features that improve its manufacturability as will be discussed in detail below.

The shroud segment 312 may include an inner diameter wall 345. The inner diameter wall 345 may extend arcuately in the circumferential direction about the axis 180. The inner diameter wall 345 may define the inner diameter surface 330. Also, the inner diameter wall 345 may define the trailing backside surface 321 and the forward backside surface 323. Both backside surfaces 321, 323 may face outwardly radially (i.e., in an opposite radial direction from the inner diameter surface 330). The backside surfaces 321, 323 may also define one or more boundaries of the internal cooling passage 346, and the internal cooling passage 346 may be configured for cooling the backside surfaces 321, 323.

The shroud segment 312 may also include the leading edge rail 342 and the trailing edge rail 340 (FIGS. 12 and 14). The leading edge rail 342 may extend outwardly along the radial axis 190 from the inner diameter wall 345, proximate the leading edge 311. The trailing edge rail 340 may extend outwardly from the inner diameter wall 345, proximate the trailing edge 313. The leading edge rail 342 and the trailing edge rail 340 may be fixedly attached to the shroud support 314. In some embodiments, one or both of the rails 340, 342 may be attached to the shroud support 314 via a hook feature, a dovetail joint, and/or another type of connection.

The shroud segment 312 may further include the first end 336 and the second end 338, which are spaced apart in the circumferential direction (FIG. 13). The first end 336 may be disposed in an end-to-end arrangement with a neighboring shroud segment 351. In some embodiments, the first end 336 may be coupled to the neighboring shroud segment 351. For example, an intersegment seal 376, such as one or more feather seals, may be included within the opposing grooves 333 of the neighboring shroud segments 312, 351. Accordingly, air flow between the shroud segments 312, 351 may be affected by the seal 376 in a predetermined manner. As shown in FIG. 13, the second end 338 may be similarly coupled to its neighboring shroud segment 359.

As shown in FIG. 13, the shroud segment 312 may further include a first end wall 364 and a second end wall 366. The second end wall 366 is shown in detail in FIG. 14, and it will be appreciated that the first end wall 364 may be substantially similar. The first end wall 364 and the second end wall 366 may extend generally outward from the inner diameter wall 345. As shown in FIG. 13, the second end wall 366 may lie within a plane that is substantially parallel to the radial axis 190, and the second end wall 366 may be spaced at a tangential distance 368 therefrom. The second end wall 366 may also be spaced apart at a tangential distance 371 from the second end 338. The first end wall 364 may be configured similar to the second end wall 366, but on the opposite side of the radial axis 190.

Furthermore, the shroud segment 312 may also include an outer wall 373. The outer wall 373 may extend in the circumferential direction between the first end wall 364 and the second end wall 366 (FIG. 13). Also, the fluid inlet 348 may be a through hole that extends through the outer wall 373. As shown in FIG. 12, the fluid inlet 348 may be fluidly connected to the shroud support inlet 315 via a sealing member 375. The sealing member 375 may be a hollow tube and may encircle the fluid inlet 348 and the shroud support inlet 315. The sealing member 375 may be a flexible, extendible, bellows-like seal, etc. that is configured to flex (lengthen and/or shorten) in the radial direction. Accordingly, the sealing member 375 may substantially hermetically seal the junction between the shroud support inlet 315 and the inlet 348 of the shroud segment 312.

The shroud segment 312 may also include an aft wall 377. As shown in FIG. 12, the aft wall 377 may have an L-shaped sectional profile with one end that is connected to the trailing edge rail 340 and an opposite outer end 349 that is connected to the outer wall 373. The aft wall 377 may also be spaced outwardly radially from the inner diameter wall 345. Also, as shown in FIG. 14, the aft wall 377 may be joined to the second end wall 366 in the circumferential direction. It will be appreciated that the aft wall 377 may be similarly joined to the first end wall 364.

As shown in FIGS. 12 and 14, the shroud segment 312 may further include an intermediate wall 379. The intermediate wall 379 may project radially outward from the inner diameter wall 345. The intermediate wall 379 may also be disposed between and spaced apart along the longitudinal axis 180 from the leading edge rail 342 and the trailing edge rail 340. The intermediate wall 379 may extend between the first end wall 364 and the second end wall 366 in the circumferential direction.

The shroud segment 312 may also include an intermediate diameter wall 383 (FIG. 12). The intermediate diameter wall 383 may extend forward along the axis 180 from an outer radial end of the intermediate wall 379. Also, the intermediate diameter wall 383 may extend in the circumferential direction between the first end wall 364 and the second end wall 366. In some embodiments, the intermediate diameter wall 383 may be cantilevered over the inner diameter wall 345. More specifically, the intermediate wall 379 may support one axial end of the intermediate diameter wall 383 and other remaining portions may extend forward, decoupled from the inner diameter wall 345 at the forward and circumferential ends.

Furthermore, the shroud segment 312 may include a forward wall 385. The forward wall 385 may extend generally outward radially from the intermediate diameter wall 383. The forward wall 385 may include an outer end 387 that is attached to the outer wall 373. Also, the forward wall 385 may extend substantially parallel to the radial axis 190 (FIG. 12). The forward wall 385 may extend in the circumferential direction between the first end wall 364 and the second end wall 366.

As shown in FIG. 13, the shroud segment 312 may further include a first inner end wall 389 and a second inner end wall 391 that are spaced apart in the circumferential direction. The first and second inner end walls 389, 391 may extend inwardly from the outer wall 373. The first inner end wall 389 may be disposed proximate the first end wall 364 and may be disposed substantially parallel to the first end wall 364. Likewise, the second inner end wall 391 may be disposed proximate the second end wall 366 and may be substantially parallel to the second end wall 366.

Additionally, as shown in FIG. 12, the shroud segment 312 may include a forward interior wall 393 and an aft interior wall 395. The forward and aft interior walls 393, 395 may extend radially inward from the outer wall 373, may turn axially toward the trailing edge 313, and may be connected at a junction 397. As shown in FIG. 13, the forward interior wall 393 may be joined to both the first and second inner end walls 389, 391 in the circumferential direction. The aft interior wall 395 may be similarly joined to the first and second inner end walls 389, 391.

The internal cooling passage 346 may be defined through the shroud segment 312 and may include the inlet 348. The internal cooling passage 346 may also include an inlet area 386. The inlet area 386 may be defined between the outer wall 373, the forward interior wall 393, the aft interior wall 395, the first inner end wall 389 and the second inner end wall 391.

The internal cooling passage 346 may also include the first chamber 352. The first chamber 352 may be defined between the inner diameter wall 345, the aft wall 377, the forward interior wall 393, the intermediate wall 379, the wall 383, the forward wall 385, the first inner end wall 389, the first end wall 364, the second inner end wall 391, and the second end wall 366. As such, the first chamber 352 includes the trailing backside surface 321.

Also, the internal cooling passage 346 may include the second chamber 354. The second chamber 354 may be defined between the inner diameter wall 345, the intermediate wall 379, the intermediate diameter wall 383, and the leading edge rail 342. As such, the second chamber 354 includes the forward backside surface 323. It is also noted that the intermediate diameter wall 383 divides the first chamber 352 from the second chamber 354.

The internal cooling passage 346 additionally includes a plurality of the first impingement apertures 353, which fluidly connect the inlet area 386 and the first chamber 352. Some of the first impingement apertures 353 extend substantially in the radial direction through the forward interior wall 393 such that impingement air is directed radially toward the backside surface 321. Other first impingement apertures 353 extend through the junction 397 and are directed substantially rearward such that impingement air is directed rearward against the inner surface of the trailing edge rail 340.

Moreover, the internal cooling passage 346 may include a plurality of the second impingement apertures 355, which fluidly connect the first chamber 352 and the second chamber 354. In some embodiments, the second impingement apertures 355 may extend radially through the intermediate diameter wall 383 such that impingement air is directed radially toward the backside surface 323.

As shown in FIGS. 12 and 13, the first and/or second impingement apertures 353, 355 may include tapered upstream ends 399. The tapered upstream end 399 may be a frusto-conic taper, such as a chamfer. Accordingly, the upstream end 399 may be wider than the opposing downstream end to improve fluid flow through the internal cooling passage 346. More specifically, the tapered upstream ends 399 may reduce loss as air enters the impingement apertures 353, 355 and/or may provide a stronger jet of air for improved cooling effectiveness. The tapered upstream ends 399 may reduce and/or eliminate flow separation and associated recirculation of the flow entering the impingement apertures 353, 355.

As shown in FIG. 12, the shroud segment 312 may include one or more internal projections 398. The internal projection 398 may be a bump, a post, a nub, or other small projection that is disposed proximate one of the impingement apertures 353, 355. In the illustrated embodiment, the internal projection 398 is shown proximate one of the first impingement apertures 353. However, it will be appreciated that other impingement apertures 353, 355 may include a respective projection 398 as well. The internal projections 398 may be configured for directing airflow within the passage 346. In some embodiments, the projections 398 may be positioned to re-direct air that would otherwise disrupt the jets of air emitted from the impingement apertures 353, 355. Thus, as shown in the illustrated embodiment, the projection 398 may be disposed proximate the aperture 353 and aligned therewith. As such, air within the first chamber 352 may flow around the projection 398, re-directed away from the downstream end of the impingement apertures 353, and toward the second impingement apertures 355.

Additionally, the shroud segment 312 may include the outlet 358. The outlet 358 may be fluidly connected to the second chamber 354. As shown in FIGS. 12 and 14, the outlet 358 may be defined in the axial direction between the leading edge rail 342 and the forward wall 385. This space may extend continuously in the circumferential direct to define a circumferential slot. Moreover, as shown in FIG. 14, the outlet 358 may be open at the circumferential ends of the shroud segment 312 as well.

The flow of cooling air through the shroud assembly 310 will now be discussed. Air within the upstream plenum 319 may flow in the downstream direction through the shroud support inlet 315 and into the inlet 348 of the shroud segment 312. Then, air within the inlet area 386 may flow through the first impingement apertures 353 and may be jetted toward the trailing backside surface 321 and the trailing edge rail 340 for cooling. The air may be redirected forward within the first chamber 352, toward the second impingement apertures 355. This air may flow through the second impingement apertures 355 and may be jetted toward the forward backside surface 323 for cooling. Then, the air may flow through the outlet 358 and into the outlet chamber 370 (FIG. 14) (i.e., the "backflow cavity"). Finally, this air may re-enter the core flow path.

Manufacturing of the shroud segment 312 will now be discussed according to example embodiments. In some embodiments, the shroud segment 312 may be a unitary, one-piece body. In other embodiments, the shroud segment 312 may be assembled from two or more members that are independently formed, then attached together. As such, the members may cooperatively define the chambers 352, 354 as well as the impingement apertures 353, 355. For example, the shroud segment 312 may include a first member 302 and a second member 304. The first and second members 302, 304 may be relatively thin-walled, hollow bodies.

The first member 302 may be a unitary one-piece member that includes the outer wall 373, the forward interior wall 393, the aft interior wall 395, the first inner end wall 389, and the second inner end wall 391. This first member 302 may be relatively hollow and box-like and may be nested within the second member 304. The first member 302 may also include the first impingement apertures 353.

The second member 304 may be a unitary one-piece member that includes the trailing edge rail 340, the forward edge rail 342, the inner diameter wall 345, the aft wall 377, the intermediate wall 379, the intermediate diameter wall 383, the forward wall 385, the first end wall 364, and the second end wall 366. The trailing edge rail 340, the aft wall 377, the intermediate wall 379, the intermediate diameter wall 383, the forward wall 385, the inner diameter wall 345, the first end wall 364, and the second end wall 366 may cooperatively define a hollow and box-like structure that receives the first member 302.

Accordingly, the first and second members 302, 304 may cooperatively define the internal cooling passage 346. The first member 302 may define the inlet 348 as well as the inlet area 386 of the internal cooling passage 346. The first chamber 352 may be defined in the space between the first member 302 and the second member 304. Also, the second chamber 354 may be defined by the second member 304, independent of the first member 302. The second member 304 may also define the outlet 358 of the internal cooling passage 346.

In some embodiments, the first member 302 and the second member 304 may be manufactured independently. For example, the first and second members 302, 304 may be separately formed using casting operations, using additive manufacturing techniques, etc. Once formed, the first member 302 and the second member 304 may be fixedly connected and hermetically sealed together.

The first member 302 and the second member 304 may be attached together at a sealed joint 306. The sealed joint 306 may attach the underside of the outer wall 373 to the outer end 349 of the aft wall 377 and the outer end 387 of the forward wall 385 (FIG. 12) as well as the outer ends of the first and second end walls 364, 366 (FIG. 13) so as to seal off the first chamber 352. The joint 306 may extend continuously and may have a generally rectangular shape when viewed from the radial perspective.

Moreover, as shown in FIGS. 12 and 13, the sealed joint 306 may be a substantially planar joint. As indicated by the line 303 in FIGS. 12 and 13, the sealed joint 306 may lie within a plane that is tangential to an imaginary circle, which is substantially centered on the longitudinal axis 180 and that has a radius substantially perpendicular to the axis 180. The interfacing surfaces of the first member 302 and the second member 304 for the joint 306 may be planar as well. Before attachment, the first member 302 and the second member 304 may define opposing planar surfaces, and these surfaces may be abutted and then attached together. Because the joint 306 is substantially planar, manufacture of the shroud segment 312 may be facilitated. Also, the hermetic seal between the first and second members 302, 304 may be ensured due to the planar configuration of the joint 306.

In some embodiments, the first and second members 302, 304 may be connected at the joint 306 via a transient liquid phase (TLP) joining process. In this process, a thin layer of prepared braze foil may be placed between the first member 302 and the second member 304, and the members 302, 304 may be heated while a compression load is applied. Material may diffuse between the opposing surfaces to connect and join the first and second members 302, 304.

In additional embodiments, the first and second members 302, 304 may be diffusion bonded together. The joint 306 may also be a brazed joint or a welded joint. In further embodiments, the first and second members 302, 304 may be joined and hermetically sealed using fasteners and one or more gaskets.

It is noted that the joint 306 is radially spaced apart at a distance 308 from the inner diameter surface 330. Accordingly, heat from the inner diameter surface 330 may distribute through the shroud segment 312 without detrimentally affecting the joint 306. Moreover, the shroud segment 312 may distribute thermal loads relatively evenly, making the shroud segment 312 more robust. For example, the first end wall 364 and second end wall 366 (FIG. 13) may extend outward a substantial distance. Accordingly, the first end wall 364 and the second end wall 366 may be more flexible to withstand the effects of thermal expansion. Again, this feature allows the shroud segment 312 to be relatively robust.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A shroud assembly for a gas turbine engine, the shroud assembly configured to receive a cooling fluid flow, the shroud assembly comprising:
    a shroud support that extends arcuately about an axis; and
    a plurality of shroud segments that are attached to the shroud support and that are arranged annularly about the axis at different circumferential positions with respect to the axis, at least one of the plurality of shroud segments being a monolithic, unitary, one-piece member and including:
        an internal cooling passage that extends through the at least one of the plurality of shroud segments;
        at least one inlet for receiving and directing the cooling fluid flow into the internal cooling passage; and
        at least one outlet;
        the at least one of the plurality of shroud segments cooperating with the shroud support to define an outlet chamber, the at least one outlet configured for outputting the cooling fluid flow from the internal cooling passage to the outlet chamber of the shroud assembly;
    the internal cooling passage being hermetically sealed from the at least one inlet to the at least one outlet.

2. The shroud assembly of claim 1, wherein the internal cooling passage includes a first chamber and a second chamber, the internal cooling passage including a first impingement aperture directed into the first chamber, the internal cooling passage including a second impingement aperture directed into the second chamber, the internal cooling passage configured to direct the cooling fluid flow from the first impingement aperture into the first chamber and downstream into the second chamber via the second impingement aperture.

3. The shroud assembly of claim 2, wherein the shroud segment includes an inner diameter surface configured to oppose a turbine blade as the turbine blade rotates about the axis;
    wherein at least one of the first chamber and the second chamber is partly defined by a backside surface that is disposed opposite the inner diameter surface; and
    wherein at least one of the first impingement aperture and the second impingement aperture is directed toward the backside surface.

4. The shroud assembly of claim 3, wherein the first chamber is partly defined by a first backside surface and the first impingement aperture is directed generally toward the first backside surface; and
    wherein the second chamber is partly defined by the second backside surface and the second impingement aperture is directed toward the second backside surface.

5. The shroud assembly of claim 2, wherein the shroud assembly includes a leading edge and a trailing edge;
    wherein the first chamber and the second chamber are spaced apart along the axis; and
    wherein the first chamber is disposed closer to the trailing edge than the second chamber with respect to the axis; and
    wherein the second chamber is disposed closer to the leading edge than the first chamber with respect to the axis.

6. The shroud assembly of claim 2, wherein the shroud segment includes a first diameter wall and a second diameter wall;
    wherein the second diameter wall divides the first chamber from the second chamber;
    wherein the first diameter wall includes an inner diameter surface configured to oppose a turbine blade as the turbine blade rotates about the axis;
    wherein the second diameter wall is cantilevered over the first diameter wall; and
    wherein the second diameter wall includes the second impingement aperture.

7. The shroud assembly of claim 1, wherein the shroud support includes a shroud support inlet;
    further comprising a sealing member that fluidly connects and seals together the shroud support inlet and the at least one inlet of the internal cooling passage of the shroud segment; and
    wherein the sealing member is flexible in a radial direction with respect to the axis.

8. The shroud assembly of claim 7, wherein the shroud support extends continuously and annularly about the axis; and
    wherein the shroud support inlet extends in a radial direction with respect to the axis.

9. The shroud assembly of claim 2, wherein at least one of the first and second impingement apertures includes an upstream end and a downstream end; and
    wherein the upstream end is tapered.

10. A method of manufacturing a shroud assembly that is configured to receive a cooling fluid flow, the method comprising:
    providing a shroud support that extends arcuately about an axis, the shroud support including a shroud support inlet;
    attaching a plurality of shroud segments to the shroud support at different circumferential positions about the axis to arrange the plurality of shroud segments annularly about the axis, at least one of the plurality of shroud segments being a monolithic, unitary, one-piece body and including an internal cooling passage that extends therethrough from an inlet to at least one outlet;
    the inlet configured for receiving and directing the cooling fluid flow into the internal cooling passage,
    the at least one of the plurality of shroud segments cooperating with the shroud support to define an outlet chamber; and
    the at least one outlet configured for outputting the cooling fluid flow from the internal cooling passage to the outlet chamber of the shroud assembly.

11. A gas turbine engine comprising:
a rotor assembly of a turbine section, the rotor assembly including a turbine blade;
a shroud assembly of the turbine section configured to receive a cooling fluid flow, the shroud assembly comprising:
    a shroud support that extends arcuately about an axis; and
    a plurality of shroud segments that are attached to the shroud support and that are arranged annularly about the axis at different circumferential positions with respect to the axis, at least one of the plurality of shroud segments being a monolithic, unitary, one-piece member and including:
    an inner diameter surface configured to oppose the turbine blade as the turbine blade rotates about the axis;
    an internal cooling passage that extends through the at least one of the plurality of shroud segments;
    at least one inlet for receiving and directing the cooling fluid flow into the internal cooling passage; and
    at least one outlet;
    the at least one of the plurality of shroud segments cooperating with the shroud support to define an outlet chamber, the at least one outlet configured for outputting the cooling fluid flow from the internal cooling passage to the outlet chamber;
    the internal cooling passage being hermetically sealed from the at least one inlet to the at least one outlet;
    the internal cooling passage including a first chamber that is partly defined by a first backside surface, which faces opposite the inner diameter surface;
    the internal cooling passage including a second chamber that is partly defined by a second backside surface, which faces opposite the inner diameter surface;
    the internal cooling passage including a first impingement aperture directed into the first chamber toward the first backside surface, the internal cooling passage including a second impingement aperture directed into the second chamber generally toward the second backside surface, the internal cooling passage configured to direct the cooling fluid flow from the first impingement aperture into the first chamber and downstream into the second chamber via the second impingement aperture.

\* \* \* \* \*